UNITED STATES PATENT OFFICE.

HUGO GERIKE, OF BERLIN, GERMANY, ASSIGNOR TO CARL WITTKOWSKY, OF SAME PLACE.

METHOD OR PROCESS OF MANUFACTURING PARQUETS FOR FLOORING AND OTHER ARTICLES.

SPECIFICATION forming part of Letters Patent No. 308,313, dated November 18, 1884.

Application filed June 10, 1884. (No specimens.)

*To all whom it may concern:*

Be it known that I, HUGO GERIKE, of the city of Berlin, Kingdom of Prussia, German Empire, have invented certain new and useful Improvements in Methods or Processes of Manufacturing Parquets for Flooring and other Articles, of which the following is a specification.

The improvements hereinafter set forth relate, chiefly, to methods of manufacturing parquets or plates for flooring, and cups, vases, and the like, and other articles, hereinafter specified. Their objects are the production and preparation of a powder proof against the influences of temperature and of water, and capable of being molded by pressure; the rendering water-proof or "hydraulization" and preparation of the natural wood employed therein; thirdly, the production of water-proof binding material for uniting the two aforesaid constituents.

The plastic powder, which has the property, when pressed in suitable hot metal molds, of uniting into a solid body of the predetermined form, presents the following advantages over artificial materials—such as mixtures of plaster-of-paris and flour, cellulose, the material made from bullocks' blood, (*bois durci*,) papier-maché, and the like—that have been heretofore used, viz: that the solid body produced therefrom is not altered in shape either by heat or by cold, and effectually resists all atmospheric influences, notably those of moisture.

For preparing the plastic powder, a convenient quantity of fine sawdust of any kind of wood is moistened and thoroughly mingled with concentrated or almost concentrated aqueous solution of a fatty soap of any suitable composition, until the soap-water has thoroughly impregnated or penetrated the sawdust in all parts. The sawdust so prepared is now completely dried, and constitutes a powder, which is treated with a more or less strong aqueous solution of lime—so-called "milk of lime"—and again thoroughly dried. It is necessary that the dry sawdust impregnated with the soap-water or the soap should be equally impregnated in all its parts with the milk of lime, and, after having then been again dried, it is thoroughly proof against the influence of moisture—that is to say, it is "hydraulized." To this plastic powder, to which hydraulic properties have been imparted by the operations above described, a quantity of air-slaked lime is added, and it is again thoroughly mixed with this addition. It is then placed into a bath consisting of ordinary commercial water-glass to which water has been added. It is thoroughly dampened therewith, and afterward air-dried. The water-glass imparts the requisite binding power to the plastic powder to enable it to form a solid body, while the above-mentioned addition of air-slaked lime renders the water-glass likewise water-resistant.

The series of successive treatments above set forth imparts to the dry plastic powder thus produced not only the qualities of a so-called "inert mass" whose shape is not affected either by heat, cold, or by moisture, rendering it also perfectly water-proof, but also enables it, when pressed in hot molds, to combine into a solid body, and when so combined to be equally able to resist all the influences above referred to.

Good results are obtained if the materials above named and treated in the manner set forth are employed in the following proportions: Take fifty kilograms of fine sawdust and thoroughly moisten the same with a soap-water consisting of 1.50 kilograms of common fatty soap, adding such quantity of water that it will thoroughly penetrate the fifty kilograms of sawdust. When thoroughly dry, the quantity of sawdust thus prepared is impregnated with a milk of lime consisting of two kilograms of slaked lime, also mixed with a suitable quantity of water varying with the porosity of the sawdust. The resulting hydraulized plastic powder being again dried, add thereto, for the purpose of hydraulizing the water-glass subsequently to be added, two kilograms of air-slaked burnt lime, then put the whole into a bath consisting of five liters water-glass of 33° Baumé, with a sufficient quantity of water to thoroughly moisten the sawdust. When again thoroughly moistened and penetrated by this solution, it is once more dried and is fit for use—viz., plastic, and has perfectly acquired the qualities hereinbefore referred to. The plastic powder thus prepared, if put into proper-heated molds, will, under pressure, assume any desired shape and form a solid stone-like body. It is, therefore, adapted for the manufacture of parquets or floor plates which resist temperature and water, while to parquets, as ordinarily made of wood, it has heretofore vainly been sought to impart these properties and they are never completely attainable therewith. The plastic powder is equally applicable to various kinds of articles for use and ornament—such as plates, cups, sculptures, vases, &c. To obtain a good result, a suitable mold is heated, a sufficient quantity of the plastic powder is strewn in and compressed in the well-known manner. The powder then penetrates into all the recesses or deep parts of the mold, solidifies, and on cooling retains the shape imparted to it. If the articles for use are to be covered with some customary coating, the same must first be covered with a likewise perfectly water-proof binding material or adhesive. Such material may be obtained as follows: Two parts, by weight, of glue are swelled in water and then dissolved in one part, by weight, of linseed-oil varnish in a water bath. To this one part, by weight, of rosin is added, which has been dissolved in alcohol, to which 0.5 parts of turpentine were added. The whole is thoroughly mixed in the water bath and spread while hot on the solid article. For the present purpose this adhesive or binding material presents not only the advantage of being absolutely water-proof, but it renders the production of blisters or air-holes in the covering absolutely impossible. This adhesive is spread on the solid article, made, as set forth, from the plastic powder. The adhesive layer is allowed to cool into a solid crust, and it is now ready to receive the covering or coating. The parquets or floor plates covering this consist of more or less richly-figured mosaic of joiners' work, made of more or less stout boards of wood. For other articles it may consist, according to requirement, of a plate of metal—say, copper, brass, or composite metals—or of simple wood veneer, marquetry-work, wood with metal veins, known as "filet," or "intarsia," cut from wood and metal together, or metal inlaid with tortoise shell, known as "genre boulle," or other composite material.

With all the coverings or coatings above referred to, where wood is employed, it is requisite that it should, before use, not only be rendered water-proof, like the plastic powder and the adhesive, but, if intended for plastic articles, must moreover be rendered flexible. Before being hydraulized it must be rendered so flexible that when being affixed to the already molded article it will neither crack nor tear nor break, but readily assume the required form and without resistance assimilate to the predetermined shape. This flexibility of thin plates of wood or veneers, whether "knife-cut" or "saw-cut," is obtained in the following manner: A bath is prepared with two parts of concentrated sulphuric acid and one of water, and into this the wood or veneer is placed. As soon as it is penetrated by the said mixture, it is washed in clean water, rinsed, and dried. The wood or veneer thus prepared now has the flexibility of moderately-stout paper, readily takes any shape, and breaks neither lengthwise nor transversely.

The hydraulization of wood or veneer, whether rendered flexible in the manner set forth or whether not requiring flexibility, for plane surfaces, as, for instance, floor-plates, is effected in the same manner as was fully specified with reference to the plastic powder—viz., the wood is first placed into a bath of soap, consisting of a common fatty soap dissolved in an appropriate quantity of water, is thoroughly impregnated therewith, and then dried. It is then placed into a milk of lime, consisting of slaked lime dissolved in more or less water, according to the porosity of the wood, and when the wood is penetrated thereby throughout it is again dried. Thereafter the wood is also perfectly water-proof, as are the plastic powder and the adhesive, and can be employed to be worked into parquets or floor-plates or for making intarsia and marquetry, or for directly coating the article, according to circumstances.

The wood rendered flexible and hydraulized by the two processes above set forth presents important new qualities for the manufacture of ordinary furniture, particularly bent-wood furniture, and can therefore be used for such purposes also.

To unite the solid articles produced by the hereinbefore-described process and covered with the aforesaid water-proof adhesive with any of the covering materials above referred to, so as to finish the same—that is to say, for parquets or floor-plates, with a composite plate of hydraulized wood for other articles with thin sheet metal veneer marquetry, or with "intarsia" of wood and metal or the like, the wood to be employed having first been made flexible and then hydraulized, the plate which is to serve as a covering or coating is placed upon the solid body in question, and both are pressed in the known manner in the previously-heated mold in which the solid body was first produced. By the heat the adhesive is again melted, and retains the covering pressed thereon by pressure continued for some time. When taken out and thoroughly cooled, the covering will not again separate from the body underneath. The article thus prepared is ready for use, whether it be a parquet, plate, cup, or sculpture, or vase, and as all the parts employed in its production—viz., the plastic powder, the adhesive, and the covering are hydraulized and prepared, and will, as has already been stated, neither swell nor shrink nor soften, it will offer great resistance, even where it is exposed to rain, wind, and weather.

I claim—

1. The process of preparing a plastic powder for the manufacture of various articles, the same consisting in impregnating sawdust with a fatty soap, and then drying the same, forming a compound for subsequent use, substantially as specified.

2. The process herein described of preparing a plastic powder for the manufacture of various articles, the same consisting in treating sawdust with a fatty soap and drying, then treating the same with aqueous solution of lime, (milk of lime,) and again drying, substantially as and for the purposes specified.

3. The process herein described of preparing a plastic powder for the manufacture of various articles, the same consisting in treating sawdust with a fatty soap and drying, then treating the dried product and redrying, then mixing with the powder air-slaked lime, and combining the whole with a solution of water-glass, and finally drying the mass, substantially as specified.

4. The plastic powder herein described, produced by treating sawdust first with fatty soap and then drying, then with lime-water and redrying, then with air-slaked lime and a solution of water-glass, and finally drying the whole, substantially as and for the purpose specified.

5. The process of preparing wood to render it pliable and water-resistant, the same consisting in treating it successively with a solution of soap and lime-water, respectively, substantially as specified.

6. The process of producing articles of various forms by combining sheets of wood rendered pliable as described with the plastic powder prepared as set forth, by means of an intervening layer of cement or adhesive glue, the whole being shaped and united under pressure, substantially as specified.

In testimony that I claim the foregoing as my invention I have signed my name in presence of two subscribing witnesses.

HUGO GERIKE.

Witnesses:
ALEX. SCHOLZE,
B. ROI.